3,023,993
SERIALLY ARRANGED VIBRATION ISOLATORS WITH LOW NATURAL FREQUENCY
James J. Kerley, Jr., Cheverly, Md., assignor to Kerley Engineering, Inc., College Park, Md., a corporation of Maryland
Filed Dec. 8, 1959, Ser. No. 858,128
3 Claims. (Cl. 248—358)

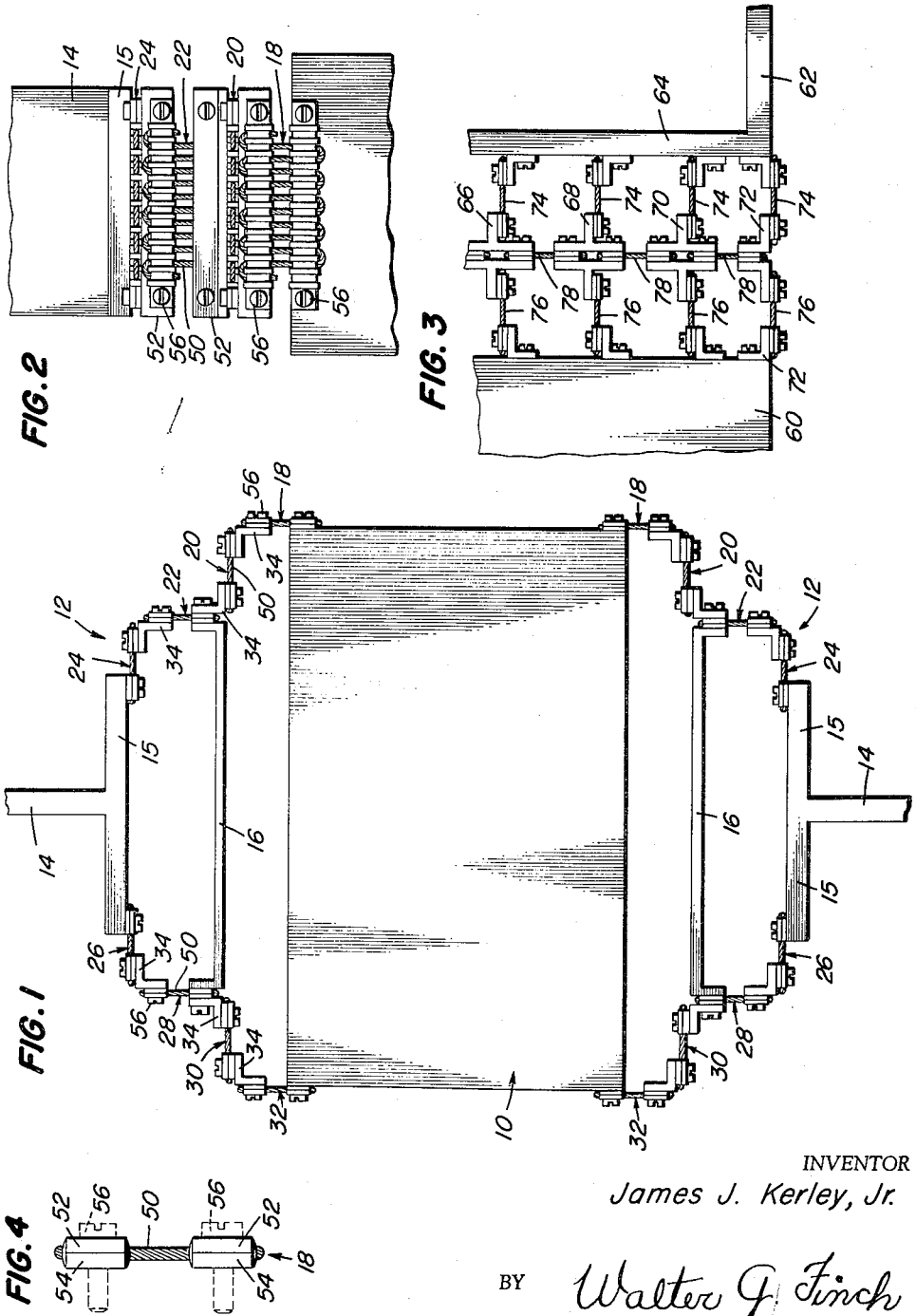

This invention relates generally to shock and vibration type isolator mounts or devices, and, more particularly, it pertains to shock and vibration isolator type mounts having serially arranged isolators to produce a low natural frequency of the system.

It is an object of this invention to provide a shock and vibration type isolator mount arrangement in which the isolators are arranged in series in order to lower the natural frequency of the system.

Another object of this invention is to provide a shock and vibration type isolator mount arrangement having a low natural frequency and which will allow more motion and absorb more energy during the subjection of the mount arrangement to shock and vibration forces.

Another object of this invention is to provide a novel shock and vibration type isolator mount arrangement which is economical to manufacture, efficient and reliable in operational use, and which is easy to install in a mounting system.

These and other objects and attendant advantages of this invention will become more readily apparent from the following detailed description and accompanying drawings in which:

FIG. 1 is a top plan view of a shock and vibration type isolator mount arrangement having serially arranged isolators incorporating features of this invention;

FIG. 2 is a side elevation of a portion of the shock and vibration type isolator arrangements shown in FIG. 1;

FIG. 3 is a perspective view of a modified shock and vibration type isolator arrangement; and FIG. 4 is an end view of a shock and vibration type isolator.

Referring now to FIGS. 1 and 2 of the drawings, there is illustrated an object, such as a delicate electronic unit 10, which is to be isolated from external shock and vibration forces. Unit 10 may be an electronic chassis requiring freedom from extraneous shock and vibration or may be a motor whose own vibrations are to be contained.

This unit 10 is supported between a pair of spaced, T-shaped angle supports 14 by means of shock and vibration type isolator mount arrangements 12, located at each corner of the unit 10.

Each support 14 is a substantially T-shaped member having a base and two leg sections 15 arranged in axial alignment.

Each side of the unit 10 to be isolated from extraneous shock and vibration forces is supported between the support 14 and the unit 10 proper by means of a plurality of serially-connected isolators 18, 20, 22, and 24, and 26, 28, 30, and 32 located at the two corners on the same side of the unit 10. Isolators of the type proposed are further described in a co-pending U.S. patent application Serial No. 744,787 of applicant, filed jointly with Raymond G. Hartenstein and Robert F. Cecce on June 26, 1958, for "Vibration Isolator Mount."

Each shock and vibration type isolator 18, 20, 22, 24, 26, 28, 30, and 32, all of which are identical, consists of two spaced pairs of flat metallic strips 52 and 54, shown best in FIGS. 2 and 4, with each pair of flat strips 52 and 54 having mating grooves provided therebetween. A resilient, multi-strand cable 50 is reeved back and forth in a plurality of passes between corresponding grooves in the two pairs of strips 52 and 54.

Rivets or screws 56 are located at opposite ends of each isolator 18, 20, 22, and 24, and 26, 28, 30, and 32 to hold the mating strips 52 and 54 together at their opposite ends and prevent the cable 50 from unraveling from the isolator unit. Also, U-shaped clips are provided between adjacent passes of cable 50 to hold the mating pairs of strips 52 and 54 together.

The shock and vibration isolators 18, 20, 22, and 24, as well as 26, 28, 30, and 32 are serially arranged as shown in FIGS. 1 and 2 of the drawings. The first isolator 18 (or 32) is secured to the unit 10 by means of screws or the like and its opposite end is coupled to a member angle member 34. The next serially arranged isolator 20 (or 30) is connected at its ends to the first mentioned angle member 34 and to an adjacent angle member 34 located intermediate isolator units 20 (or 30) and 22 (or 28), respectively. The third isolator 22 (or 28) is connected to the two angle members 34 positioned intermediate isolator 24 (or 26) and isolator 20 (or 30).

Isolator 22 (or 28) is also connected to a substantially U-shaped channel member 16. Isolator 24 (or 26) is mechanically connected to one of the legs 15 of the support 14 and its opposite end is connected to angle 34 located between isolators 24 and 22 (or 26 and 28), as the case may be.

The opposite side of the unit 10 is mounted in a similar manner by corresponding components. Thus, the shock and vibration type arrangement 12 is provided at each corner of the unit 10 which is to be supported between the pair of spaced supports 14.

In FIG. 3, there is shown a modification of the support arrangement 12, in which a plurality of previously described isolators 74, 76, and 78 are located between cross-shaped support members 66, 68, and 70. In addition, the plurality of isolator 74, 76 and 78 is positioned between channel angle members 72 at the sides between the L-shaped member support 62 and the unit 60 which is to be supported and isolated from extraneous shock and vibration forces. The modified corner support arrangement shown in FIGURE 3 may be connected to that of an adjacent corner support in the manner in which member 16 connects adjacent assemblies 12 of FIGURE 1.

It is to be noted that the support 62 is a substantially L-shaped member having a base 64 with a plurality of member angle members 72 spaced therealong and secured thereto by means of bolts, screws, or the like. This same angle unit 72 can be used to support the isolators 74, 72, and 76 and attach them to the unit 60 which is to be isolated.

It has been found necessary to provide such serially arranged isolators 18, 20, 22, 24, or 26, 28, 30, and 32; 74, 76, and 78 in order to lower the natural frequency of the system and in order to allow more motion thereof. In addition, the system as provided can absorb more energy during the subjection of the system to shock and vibration forces.

The natural frequency of the mount system in shock and vibration is a function of the square root of $k$, where $k$ is the stiffness factor of each isolator, such as 18, 20, 22, 24, 26, 28, 30, 32, 74, 76, or 78. When the isolators 18, 20, 22, 24, etc. are located in series as shown in FIGS. 1, 2, and 4, then:

$$\frac{1}{k} = \frac{1}{k_1} + \frac{1}{k_2} \qquad \text{Equation (1)}$$

This means that a series of shock and vibration type isolators, such as 18, 20, 22, 24, 26, and so forth as shown in FIGS. 1 and 2; or 74, 76, and 78 as shown in FIG. 3, will have a lower natural frequency proportional to the square root of the reciprocals in the equation mentioned above.

The mounting of these isolators 18, 20, 22, 24, 26, 28, 30, and 32, as shown in FIGS. 1 and 2, or isolators 74, 76, and 78 as illustrated in FIG. 3 will then allow more motion of the systems, and thus more energy will be absorbed during the subjection of the system to shock and vibration forces.

It has been found that there are some critical problems for this type of shock and isolation system. This particular type of isolation system under a low frequency, large amplitude vibration could wind-up at resonance and the critical thing is to keep the excursion low and in that way, through pre-stressing of the members, prevent excessive motion in any one particular plane. This means, then, that special types of pre-stressing of the elements must be balanced out for every particular case.

The previously mentioned floating U-shaped channel members 16 located between each support 14 and the unit 10, shown in FIG. 1, to be isolated must be designed in such a way as to pull in and, at the same time, control the motion laterally and vertically of the entire system.

In summary, the natural frequency control of the shock and vibration isolation mount system is based upon having a multiplicity of cables which can be combined in the isolators 18, 20, 22, 24, etc. of FIGS. 1 and 2 or isolators 74, 76, and 78 as illustrated in FIG. 3.

In operational use, the unit 10 to be isolated from shock and vibration forces is mounted as shown in FIGS. 1 and 2, or as shown in FIG. 3, with the isolators being secured between the supports 14 or 62 and the unit 10 or 60 which is to be isolated, respectively. Such shock and vibration arrangements can be effectively and efficiently used to isolate the units 10 and 60 from external shock and vibration forces.

Obviously, many other modifications and variations of the present invention are possible in light of the above teachings. It is, therefore, to be understood that within the scope of the appended claims the invention may be practiced otherwise than as specifically described.

What is claimed is:

1. In combination, a mass, first and second support means positioned on opposite sides of the mass, a pair of cable-type isolators positioned on each support means and extended therefrom, cable-type isolators mounted transversely on each extended isolator remotely of the support means, a first connecting member rigidly coupling the two last recited isolators supported from the first support means at a position remote from the first recited isolators, a second connecting member rigidly coupling the two last recited isolators supported from the second support means at a position remote from the first recited isolators; and means resiliently coupling the mass to the ends of the first and second connecting members, said cable-type isolators each comprising a pair of parallel mounting strip means and lengths of cable forming parallel connecting passes between the pair of mounting strip means, each mounting strip means embracing the cable at each end of each pass.

2. The structure defined in claim 1 wherein the means resiliently coupling the mass to the ends of the connecting members comprises cable type isolators mounted at each end of each connecting member.

3. The structure defined in claim 1 wherein the means resiliently coupling the mass to the ends of the connecting members comprises pairs of cable type isolators transversely connected together mounted in series supporting relationship between each end of each connecting member and the mass.

References Cited in the file of this patent
UNITED STATES PATENTS

Re. 22,280    Lord _____ Mar. 2, 1943
2,873,109    Hartenstein _____ Feb. 10, 1959